United States Patent
Pulley et al.

[11] Patent Number: 6,164,880
[45] Date of Patent: Dec. 26, 2000

[54] METHOD FOR PRODUCING AND CONTROLLING A FILLET ON A GEAR

[75] Inventors: Franklin T. Pulley, Peoria; Michael W. Kipling, Metamora; Gregory A. Matson, St. Charles, all of Ill.; Danny L. Thurman, Pineland, Fla.; Bennett W. Avery, Princeville, Ill.

[73] Assignee: Caterpillar Inc., Peoria, Ill.

[21] Appl. No.: 09/256,044

[22] Filed: Feb. 23, 1999

[51] Int. Cl.⁷ .................................................. B23F 1/06
[52] U.S. Cl. .................................... 409/10; 409/1; 409/26; 409/51; 451/47
[58] Field of Search ................. 29/33 R; 409/10–26, 409/61, 2, 51; 72/467, 53; 74/462, 458, 461; 451/47; 474/15

[56] References Cited

U.S. PATENT DOCUMENTS

| | | | |
|---|---|---|---|
| 3,595,130 | 7/1971 | Maker | 409/10 |
| 3,881,364 | 5/1975 | Rouverol | 74/462 |
| 3,902,811 | 9/1975 | Altman et al. | 356/398 |
| 3,968,701 | 7/1976 | Maruyama | 474/15 |
| 4,167,864 | 9/1979 | Taipale et al. | 72/53 |
| 4,644,814 | 2/1987 | Rouverol | 74/462 |
| 4,651,588 | 3/1987 | Rouverol | 74/462 |
| 5,083,474 | 1/1992 | Rouverol | 74/461 |
| 5,123,786 | 6/1992 | Yates et al. | 407/38 |
| 5,181,375 | 1/1993 | Thurman et al. | 51/287 |
| 5,275,046 | 1/1994 | Nagpal et al. | 72/467 |
| 5,379,554 | 1/1995 | Thurman et al. | 451/177 |
| 5,615,579 | 4/1997 | Shiow-Miin | 74/462 |
| 5,624,301 | 4/1997 | Lenz et al. | 451/47 |
| 5,802,921 | 9/1998 | Rouverol | 74/458 |

*Primary Examiner*—William Briggs
*Attorney, Agent, or Firm*—Haverstock, Garrett & Roberts

[57] ABSTRACT

A method for producing a fillet on a gear as a function of a plurality of design criteria points in disclosed. The present method includes the steps of fitting a polynomial curve to the design criteria points, and producing the fillet on the gear, the fillet having a curved shape corresponding to the fitted polynomial curve. As a further step for control of the fillet, the actual shape of the fillet produced can be inspected and compared to the fitted curve, using a coordinate measuring machine or other suitable device. According to a further aspect of the invention, the fillet is produced using a tool having a curved surface corresponding to the polynomial curve.

9 Claims, 2 Drawing Sheets

6,164,880

METHOD FOR PRODUCING AND CONTROLLING A FILLET ON A GEAR

TECHNICAL FIELD

This invention relates generally to a method for producing a fillet on a gear and controlling the same, and more particularly, to a method for producing a fillet to a shape derived as a function of design criteria for the fillet, and inspecting the fillet for conformance to the derived shape.

BACKGROUND ART

In the design of gears, one of the main limiting factors in the load capacity of a given gear is the bending strength of its teeth. Although it is known to increase bending strength by selecting gear teeth having a corser pitch, this has been found to normally reduce the gear's load capacity in other types of failure modes such as pitting and scuffing. Many strategies are known for increasing bending strength of a gear without altering the general gear design, including, but not limited to, use of better materials, hardening methods, and shot peening.

Another strategy would be to reduce the peak bending stress value of a gear tooth without changing the basic tooth dimensions. In this regard, it is known that the typical location for the peak bending stress is the tooth fillet which encompasses a transition area extending between the start of an active profile region of the tooth wherein it engages teeth of a mating gear and the root of the tooth where it joins the gear body. An ideal stress reduction strategy would reduce the stress gradient along the tooth fillet such that high stress concentrations are not present.

Accordingly, the present invention is directed to achieving one or more of the objectives as set forth above.

DISCLOSURE OF THE INVENTION

In one aspect of the present invention, a method for producing a fillet on a gear as a function of a plurality of design criteria points is disclosed. The present method includes the steps of fitting a polynomial curve to the design criteria points, and producing the fillet on the gear, the fillet having a curved shape corresponding to the fitted polynomial curve. As a further step for control of the fillet, the actual shape of the fillet produced can be inspected and compared to the fitted curve, using a coordinate measuring machine or other suitable device. According to a further aspect of the invention, the fillet is produced using a tool having a curved surface corresponding to the polynomial curve.

BEST MODE FOR CARRYING OUT THE INVENTION

Figure 1:
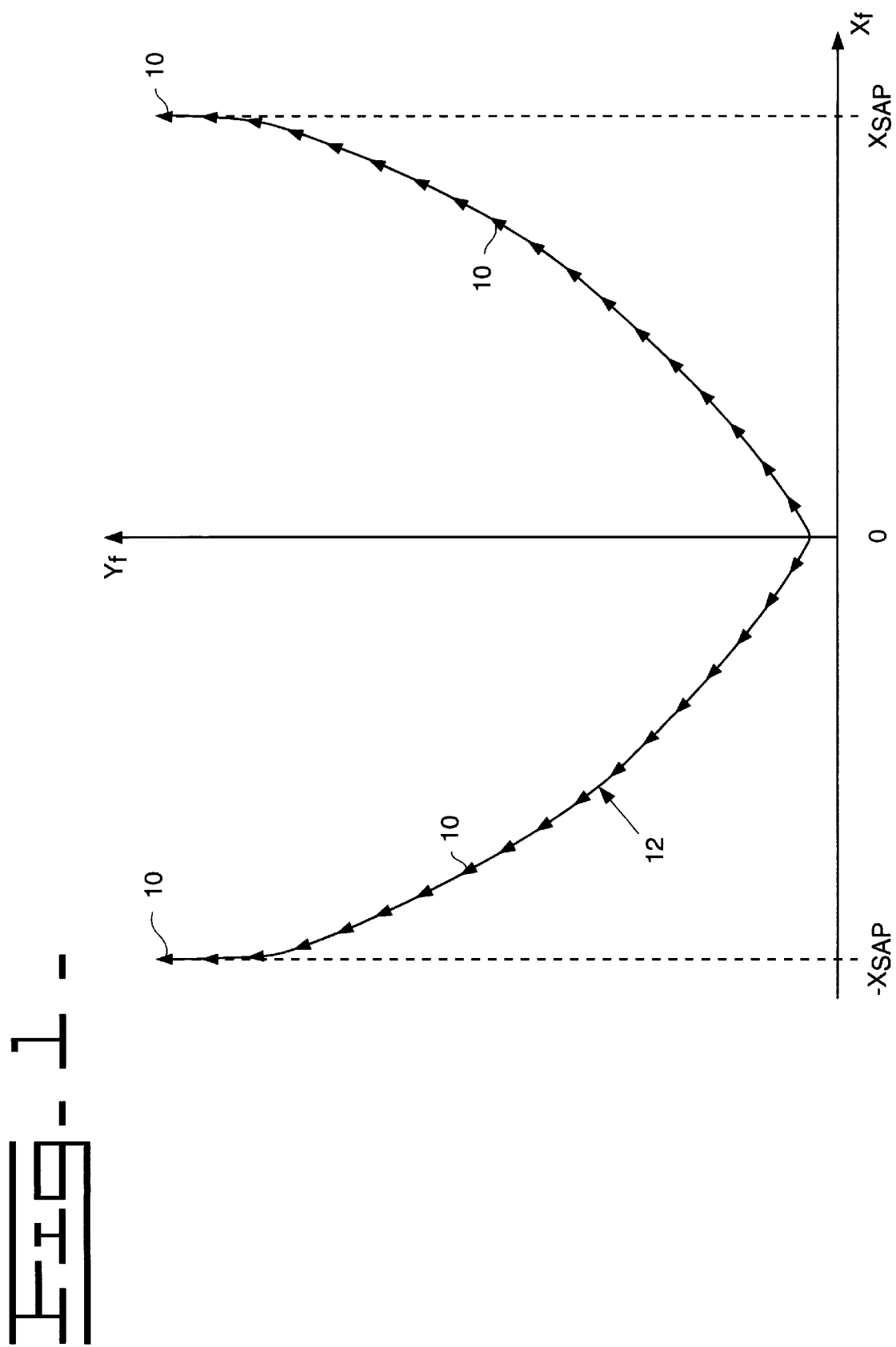
FIG. 1 is a diagrammatic representation showing a curve fitted to a plurality of design criteria points for a pair of fillets according to the present invention.

Referring now to the drawings, FIG. 1 is a graph of a plurality of design criteria points 10 for a pair of fillets to extend from the start of the active profile ($-X_{sap}$) of a first gear tooth through the root of the tooth (0), to the start of the active profile ($X_{sap}$) of an adjacent second gear tooth. The locations of points 10 have been determined using an algorithm which provides a relatively flat stress gradient for the fillets, that is, a stress gradient wherein load stresses are substantially evenly distributed along the fillets, such that no substantial stress concentrations are present along the fillet surfaces so as to reduce the likelihood of one or both of the gear teeth breaking in the vicinity of the fillet due to excessive bending stresses.

A polynomial curve 12, preferably of the second order, is fitted to points 10 as shown using a conventional curve fitting technique, such as the well known least squares technique, using an equation such as the following.

$$y_f = \sum_{n=0}^{N} C_n x_f^n$$

Figure 2:
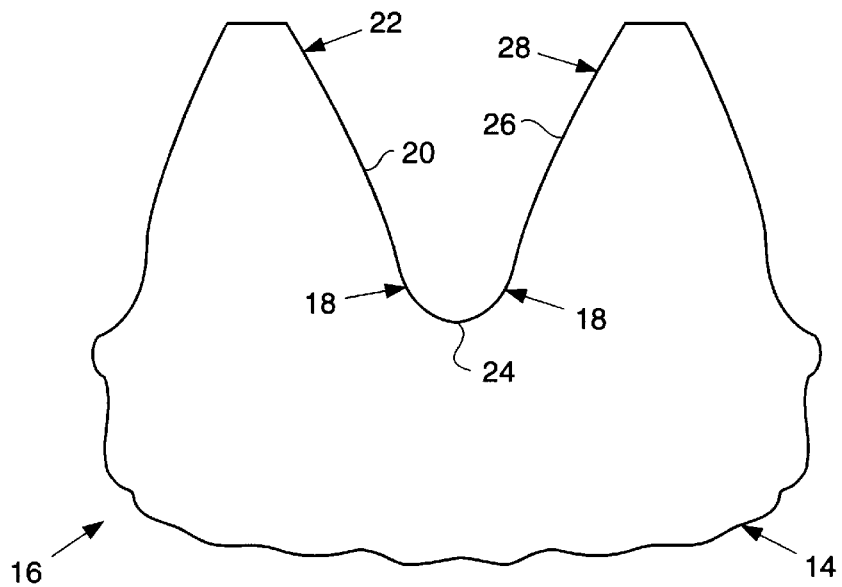
FIG. 2 is a schematic representation of a gear segment including fillets having curved profile shapes produced to the curve of FIG. 1.

Turning to FIG. 2, a segment 14 of a gear 16 is shown including fillets 18 produced according to the present invention. Each fillet 18 extends from the start of the active profile 20 or 26 of a respective first gear tooth 22 or an adjacent second gear tooth 28 to the tooth root 24.

Fillets 18 can be produced using any of a variety of conventional gear manufacturing techniques, including, but not limited to, by milling with a milling cutter, forming with a shape cutter, hobbing, diecasting, drawing, extruding, forming from sintered powder, stamping, or finish grinding of a near net shape which is either machined or forged, preferably to have an outer surface curved to correspond to the desired curved shape leaving a substantially uniform layer of finish stock on the gear. Fillets 18 can also be formed by injection molding in the instance of non-metallic gears. Preferably, the curve fitted to the design criteria points is reproduced on the cutter, hob, die, and/or grinding wheel such that the curve is imparted to the fillet when the fillet is produced thereby.

After the fillet has been produced, the curved shape thereof can be compared to the original curve to determine the conformity of the fillet to the curve. This can be accomplished using suitable conventional means, such as, but not limited to, a coordinate measuring machine or the like.

Figure 3:
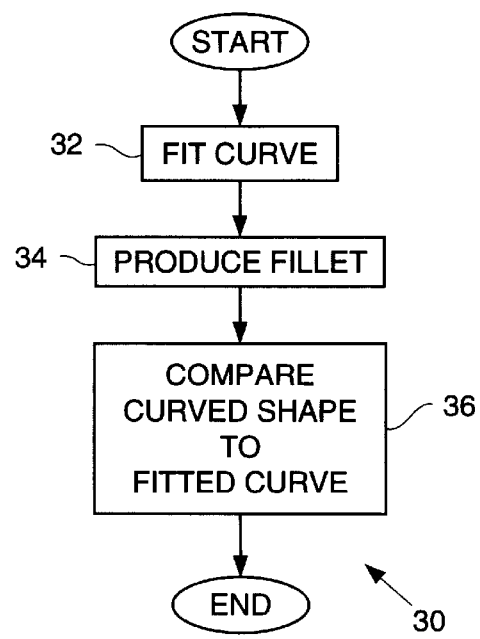
FIG. 3 is a block diagram of the present method.

Turning to FIG. 3, a flow chart 30 of the present method is shown. Starting at block 32, a polynomial curve is fit to a plurality of design criteria points determined to provide the desired design characteristics for the fillet. At block 34 fillets are produced on a gear between adjacent teeth of the gear, the fillets each having a curved shape corresponding to the polynomial curve fitted at block 32.

Then, at block 36 the curve of the fillets produced are compared to the fitted curve for verifying conformance of the curved shaped thereto.

Industrial Applicability

The present method for producing and controlling a gear fillet has utility for use with gears for a wide variety of purposes, particularly wherein design of the fillet to better withstand bending stresses is an important design consideration.

Other aspects, objects and advantages of the present invention can be obtained from a study of the drawings, the disclosure and the appended claims.

What is claimed is:

1. A method for producing a fillet on a gear as a function of a plurality of design criteria points, the method comprising the steps of:

(a) fitting a polynomial curve to the design criteria points to provide a stress gradient wherein load stresses are substantially evenly distributed along the fillet; and (b) producing the fillet on the gear, the fillet having a curved shape corresponding to the polynomial curve fitted in step (a).

2. The method, as set forth in claim 1, comprising the further step of comparing the fillet produced in step (b) with the curve fitted in step (a).

3. The method, as set forth in claim 2, wherein the further step is performed using a coordinate measuring machine.

4. The method, as set forth in claim 1, comprising the further step of providing a tool having a curved surface corresponding to the polynomial curve fitted in step (a), and wherein the fillet is produced using the tool to impart the curved shape to the fillet.

5. The method, as set forth in claim 4, wherein the tool is a grinding tool.

6. The method, as set forth in claim 4, wherein the tool is a cutting tool.

7. The method, as set forth in claim 1, where in step (b) the gear is when the fillet is produced, the finish stock having an outer surface having a curved shape corresponding to the polynomial curve such that a substantially uniform layer of the finish stock is removed to produce the fillet.

8. The method, as set forth in claim 1, wherein the polynomial is at least a second order polynomial.

9. The method, as set forth in claim 1, wherein the design criteria points have locations determined at least in part using an algorithm for providing the desired distribution of stress along the fillet.

* * * * *

UNITED STATES PATENT AND TRADEMARK OFFICE
CERTIFICATE OF CORRECTION

| | |
|---|---|
| PATENT NO. | : 6,164,880 |
| DATED | : December 26, 2000 |
| INVENTOR(S) | : Pulley et al. |

Page 1 of 1

It is certified that error appears in the above-identified patent and that said Letters Patent is hereby corrected as shown below:

Claim 7,
Line 6, after "gear is", insert -- produced from a near-net shaped forging including finish stock that is removed --.

Signed and Sealed this

Twenty-third Day of October, 2001

Attest:

NICHOLAS P. GODICI
Attesting Officer
Acting Director of the United States Patent and Trademark Office